N. B. WALES.
COMBINED REFRIGERATING AND HOT WATER STORAGE APPARATUS.
APPLICATION FILED DEC. 20, 1918.
1,331,600.
Patented Feb. 24, 1920.
4 SHEETS—SHEET 2.
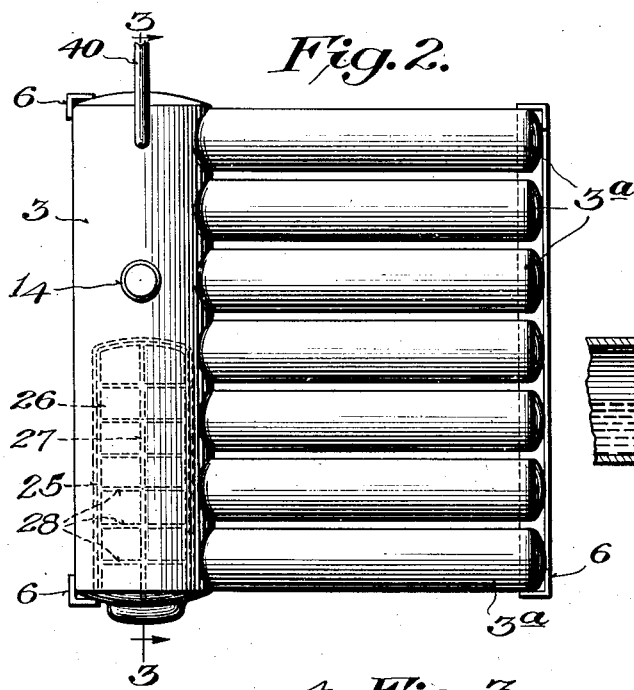
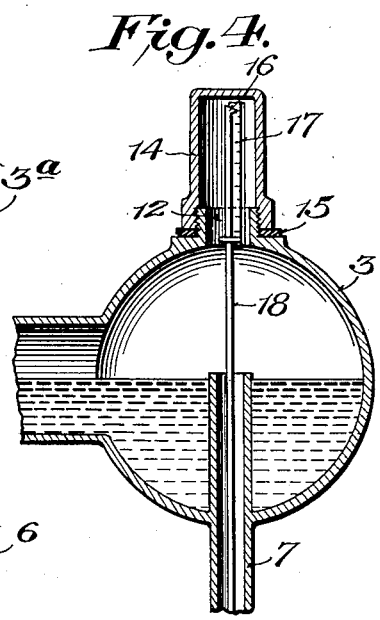
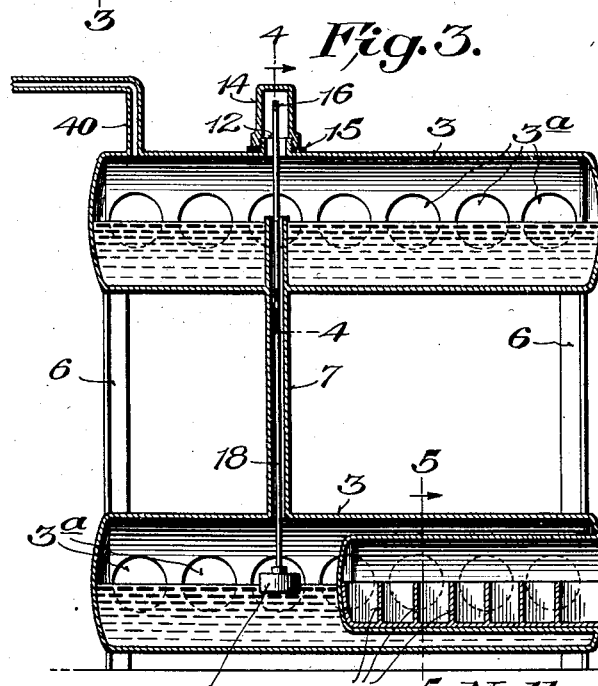
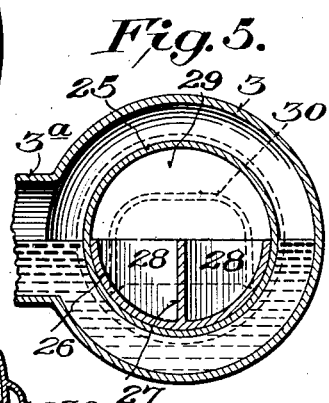
Inventor
Nathaniel B. Wales,
Witness
Chas. L. Griesbauer
By Eugene C. Brown
Attorney

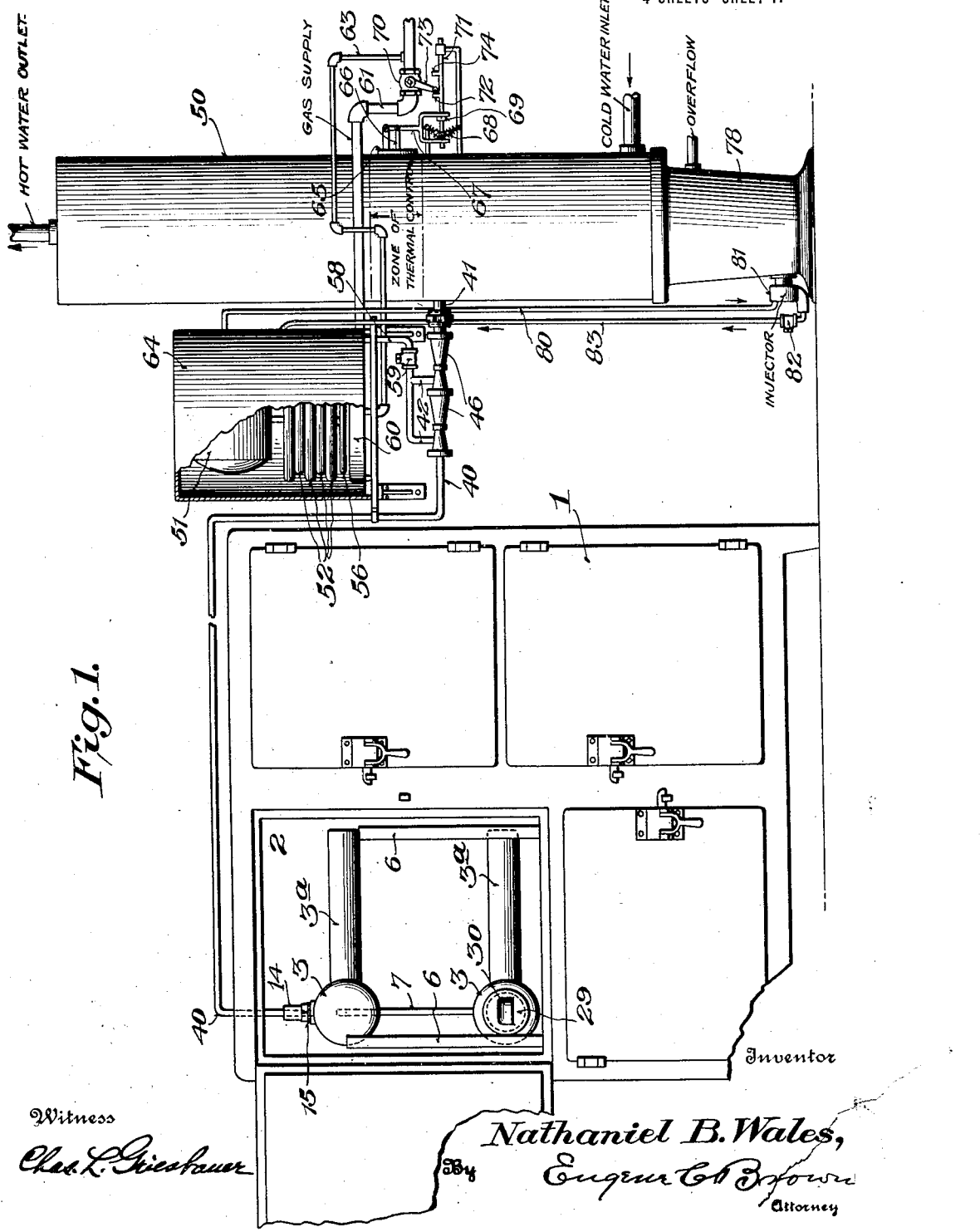

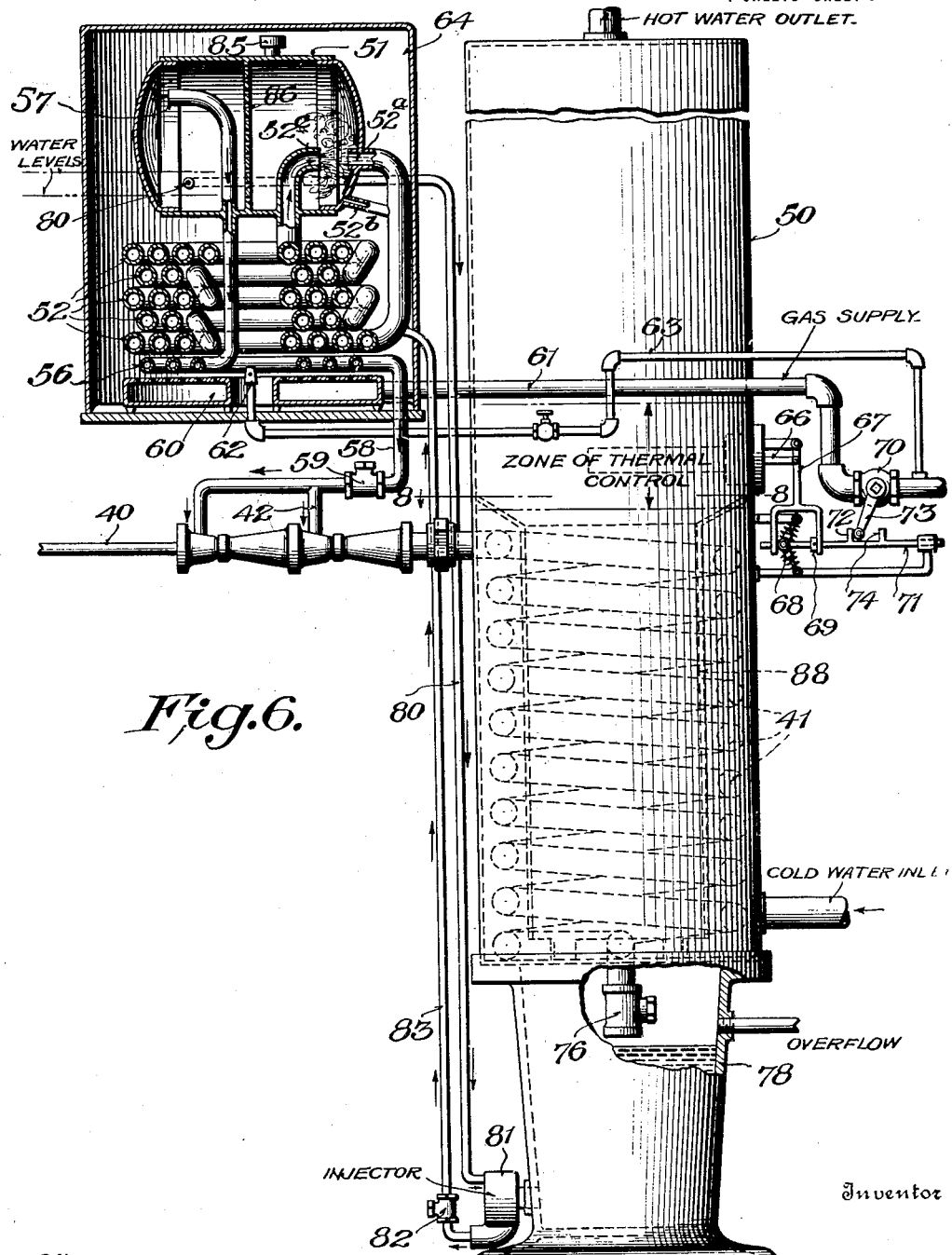

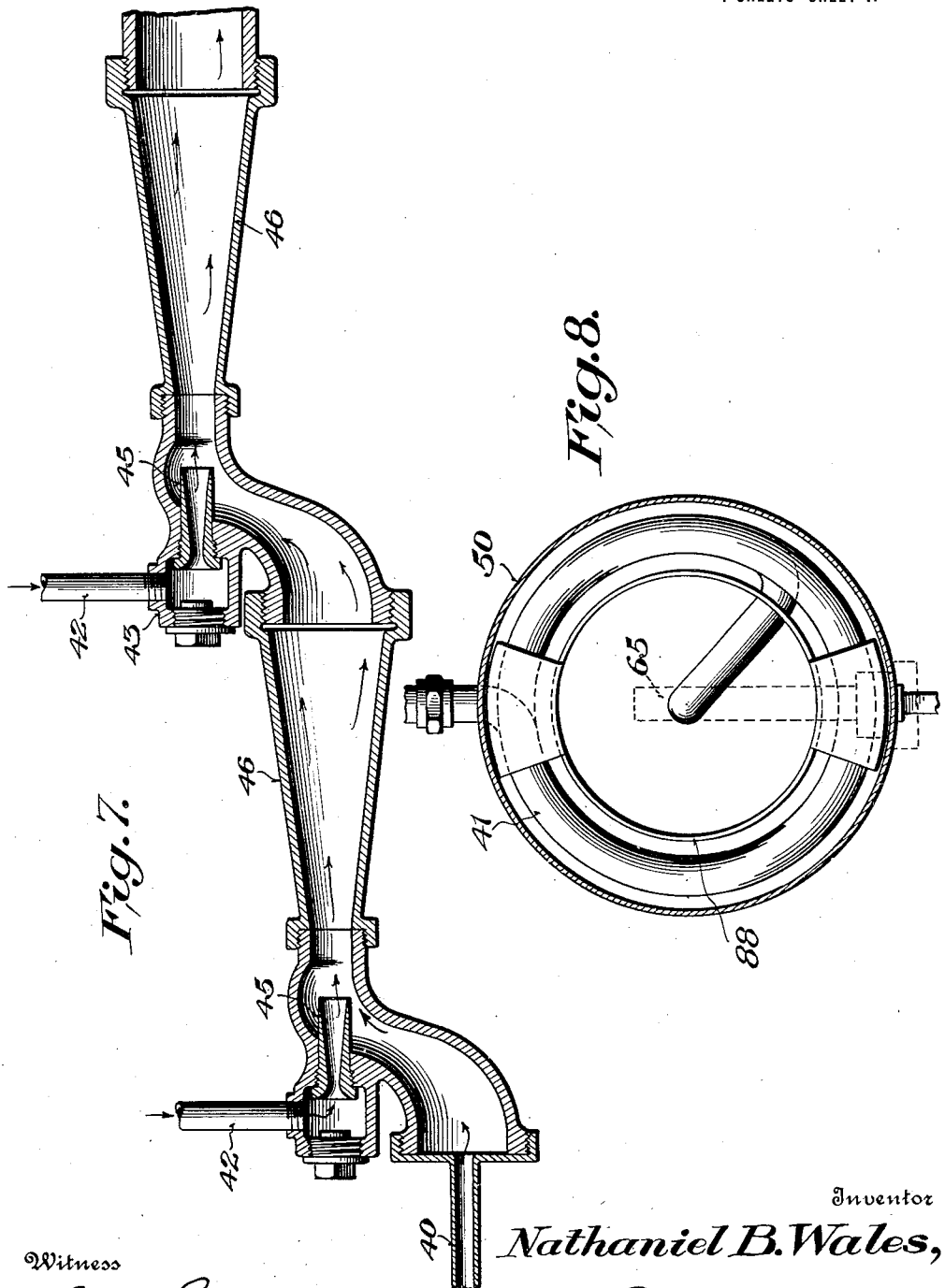

UNITED STATES PATENT OFFICE.

NATHANIEL B. WALES, OF NEW YORK, N. Y., ASSIGNOR TO GEORGE LEWIS, OF NEW YORK, N. Y.

COMBINED REFRIGERATING AND HOT-WATER-STORAGE APPARATUS.

1,331,600.  Specification of Letters Patent.  Patented Feb. 24, 1920.

Application filed December 20, 1918. Serial No. 267,640.

*To all whom it may concern:*

Be it known that I, NATHANIEL B. WALES, a citizen of the United States, residing at New York, in the county of New York and State of New York, have invented certain new and useful Improvements in Combined Refrigerating and Hot-Water-Storage Apparatus, of which the following is a specification.

This invention relates to a system of refrigeration and hot water heating for domestic purposes wherein the heat abstracted from the water undergoing refrigeration and the heat derived from the condensation of the steam jets employed in producing the vacuum over the evaporating pans in the refrigerator is utilized in heating the hot water supply.

One of the objects of my invention is to provide a combined system in which there is such an interrelation between the refrigerating and heating parts that the maximum economy is obtained. To this end my invention enables the process of refrigeration to be effected under the direct control of the volume and temperature of the hot water storage. A further object is to provide a system which is entirely automatic in operation and which is without moving parts, stuffing boxes or chemicals and in which no waste cooling fluid is necessary. The apparatus is simple to manufacture and can be placed on the market at a very low cost.

In all refrigerating systems a large mass of heat involved in the energy of heat transfer is always rejected and thrown away. One of the essential objects of this invention is the conserving of this waste in the form of the valuable household necessity, hot water. I make the generating of a body of hot water, the time element factor in the cyclic sequence which marks off the automatic nature of my apparatus. In this manner the cost of operating this system is reduced to a real minimum as two valuable products result from its cyclic operation, hot water and refrigeration. When a certain volume of hot water has been accumulated by conserving the heat rejected in the vacuum-producing steam-jets through the transfer of heat from a condensing coil, which is located within a hot water storage tank, my system stops its entire action and is latent until the hot water already generated has been drawn off for domestic purposes.

The system can be quickly installed, the vacuum refrigerating trays being made in different sizes to fit any refrigerator now in use. The series of steam ejector jets, using steam at approximately 50 lbs. pressure and slightly super-heated by my boiler construction, produce less than .08 lbs. pressure absolute in the evaporation trays, allowing the use of a brine therein and thereby giving an accumulation of cold to bridge over the time interval when the hot water stored in the water tank has not been drawn out.

An ice drawer is recessed in the lower tray in the evaporator and subdivided to provide cubes of ice for table use, this drawer being positioned below the brine level therein.

One of the essential features of this invention is the utilization of a single water heating and storage tank in which is positioned a coil at its lower end which constitutes the condenser for the steam and into which the steam jets discharge. In order to obtain a vacuum sufficient to give an evaporation sufficient to obtain temperatures which will freeze ice, it is essential to have that portion of the coil nearest the steam jets always maintained at a relatively low temperature. In order to assure the continuity of such a temperature and to avoid a waste of gas by the inefficient operation of this system, the volume of hot water stored in this tank is limited to a point in its accumulation, as it works down from the top of the tank to a point just above the top of this condensing coil. This determination of the extent of the accumulation of hot water is effected by positioning a thermostatic element in the tank at this point, which shuts off the source of heat when the hot water has accumulated in the tank down to this point. In this manner within a single tank of a type common to domestic installation an effective vacuum can be maintained in the refrigerating portion coincidentally with the efficient heating and accumulation of water and in case the system tends to become unbalanced, due to an excessive accumulation of hot water, the thermostat shuts down the entire system.

The spirit of the invention is, therefore, the conservation of the heat abstracted from the refrigerating pans (heat of evaporization) together with that derived from the steam jets which create the vacuum, by transferring and storing such heat units in the body of water surrounding the coils of the condenser and thermostatically controlling the cycle of operation by the volume and temperature of this water so heated. In other words, my invention comprises a process of refrigeration and water heating, wherein the refrigerative cycle is limited to and dependent upon the water heating cycle.

The purpose and operation of this invention will be understood and appreciated from the following detailed description of an apparatus for carrying it into effect, reference being made to the accompanying drawings in which—Figure 1 is a front elevation of an apparatus for carrying out my process; Fig. 2 is a top plan view of the vacuum refrigerating tanks; Fig. 3, is a vertical sectional view on the line 3—3 of Fig. 2; Figs. 4 and 5 are enlarged detail sectional views on the lines 4—4 and 5—5 of Fig. 3; Fig. 6 is an enlarged side elevation, partly in section of the steam generator, hot water storage tank and condenser; Fig. 7, is an enlarged sectional view of the steam jet injectors, and Fig. 8 is a horizontal section above the deflector plate on line 8—8 of Fig. 6.

The refrigerating unit is designed to fit into the ice compartment 2 of the ordinary domestic refrigerator 1, and consists of one or more vacuum freezing tanks, each of which comprises a main tank 3 and a series of lateral branches 3ª, the whole being united and braced by vertical angle irons 6 forming standards. The interiors of the two tanks are connected by a pipe 7, extending from the top of the lower tank to about the middle of the upper tank, as shown in Fig. 3. The flanged filling opening 12, is sealed by a cap 14, which screws against a gasket 15. Upon removing the cap and pouring water into the upper tank the latter is first filled up to the water level and then overflows through the pipe 7 into the lower tank, the water level being determined by a gage pointer 16, moving in front of a scale 17 extending through the filling opening, the pointer being attached to a wire 18 extending through the pipe 7 and carried by a float 20. This refilling the trap with water to maintain the brine of approximately constant specific gravity may be done automatically as well.

In order to provide a convenient method of supplying small cubes of ice for glasses of ice water and other purposes. I construct one of the tanks with a chambered head formed by welding therein a small tube 25, closed at its inner end. A semi-tubular vessel 26 divided by a longitudinal partition 27 and a plurality of transverse divisions 28, forming pockets for the water to be frozen into cubes, slides into the tube 25, and is provided with an end cover plate 29 having a pull handle 30.

The vacuum pipe 40, which may be made of small copper tubing, leads from the top of the upper tank to the casing of the steam ejector jets and the latter exhaust into the coil 41 of the condenser located in the lower part of the domestic water boiler or hot water tank 50. In order to produce a high vacuum I employ two or more steam jet ejectors operating in series or cascade arrangement. The steam supply pipes 42, connect with the inlets 43, supplying steam to the nozzles 45, which discharge into the restricted or neck portions of the Venturi tube portions 46, the kinetic energy of the steam as it expands therein producing a strong pull or suction through the vacuum pipe 40.

The steam generator, shown in detail in Fig. 6, comprises a small steam boiler 51, to which is connected the steam generating coil 52, connected at the water inlet end 52ª with the end of the boiler and also by the branch pipe 52ᵇ, and at the steam discharge end 52ᶜ with the interior of the boiler above the water line. The super-heater coil 56, is connected by a steam inlet 57 to the interior of the boiler and by an outlet pipe 58 through a check valve 59 with the ejector supply pipes 42. The main gas burner 60 is directly connected with the gas main 61, while the pilot burner 62 is connected by a branch 63 which taps into the main on the street side of the main cut-off valve 70. The steam generator unit is preferably supported on a shelf in the cellar, basement or laundry and may be entirely inclosed by an enameled casing 64.

The gas supplied to the main burner is automatically turned on or cut off at the valve 70, by a thermostat 65, which extends through the boiler casing into the water in the intermediate or thermal control zone. Any suitable or known cut-off device may be employed. For purposes of illustration, I have shown the expansion bar 66 of the thermostat pivoted to a lever 67 having a yoke at its free end adapted to alternately engage opposite sides of a snap-over spring toggle 68, as the bar 66 expands and contracts. When the water in the thermal control zone reaches the predetermined temperature, the bar 66 expands and moves the yielding spring arms of the toggle to the right until they pass the center when they snap with a sharp blow upon the lug 69, thereby sliding the rod 71 in its bearings and causing the lug 72 to move the lever 73 of the gas valve to shut off the gas. When the temperature of the water in the thermal-control zone falls below the predetermined temperature, the rod 66, contracts and causes the yoke to strike the lug 69 and push the toggle in the opposite direction until it snaps over against the left-hand yoke arm, thereby causing the lug 74 on the rod 71 to strike a sharp blow upon the valve lever 73, thus turning the gas onto the main burner. This cycle of operations is repeated whenever hot water is drawn in sufficient quantity from the tank.

The water which condenses in the coil 41, escapes through the check valve 76 into the sump basin 78. The water level in the steam generating boiler 51 is maintained automatically. When it drops below the open end of the pipe 80, steam passes down this pipe to actuate a steam injector 81 which draws water from the sump basin and forces it past the check valve 82, and through the pipe 83, into the coil 52; and as soon as the water rises to the upper level, thereby shutting off the mouth of the pipe 80, the injector will cease to operate. While both pipes 80 and 83 are normally full of water, the difference in height between the inlet of pipe 80 and the outlet of pipe 83 is sufficient to start the injector as soon as the inlet 80 is exposed to the action of the steam within the tank 51. This action is also assisted by the suction exerted at the outlet of pipe 83, caused by the circulation of steam and water through the coil 52. It is evident that the inlet opening of pipe 80 may also be controlled by a float valve or in any other well known manner. Excessive steam pressure in the boiler is prevented by a safety valve 85.

In order to induce the depositing of scale or sediment upon the interior walls of the coil, the circulation of water and steam through the generating coil 52 is increased by turning the outlet end 52$^c$ toward the outlet 52$^a$ so that the water spray which is mingled with the steam is forcibly discharged into the inlet end 52$^a$ while the steam escapes. For the purpose of obtaining comparatively dry steam in the pipe 57, leading to the super-heater coil, I separate the boiler into two chambers by a perforated wall or screen 86. A deflector plate 88 may be inserted in the base of the tank to increase and define the circulation of the water in the lower end of the tank.

My process or method of operation will be understood from the foregoing detailed description of an apparatus designed to carry it into effect. The cycle of operations is begun by lighting the burners 60 and 62, to generate steam for the steam jets 45 in the Venturi casings 46. The ejector action of these jets produces a high vacuum in the tube 40 and the refrigerating tanks 3, 3$^a$, which lowers the boiling point of the water contained therein, as is well known, thus causing the rapid vaporization of a certain amount of the water and thereby abstracting heat and lowering the temperature sufficiently to freeze the water or brine. The freezing point may be lowered, as is usual in refrigerating systems by dissolving a chemical therein, such as calcium chlorid, which may conveniently be placed in the tanks in dry powdered form at the factory when the parts are assembled.

A high vacuum is maintained in the refrigerating system by condensing the steam as it leaves the casing of the ejector. The efficiency of the condenser coil 41 is maintained by placing the coil in the lower cold water end of the boiler and stopping the operation as soon as the temperature of the water surrounding the coil rises to a degree which will no longer efficiently condense the steam to produce the high vacuum required. The heat units absorbed by the condenser are immediately transferred to the surrounding water which rises as it is heated and accumulates in the upper part of the tank which constitutes the hot water storage and is always the hottest part. This operation continues until the volume of hot water approaches the thermostat which is located above the condenser in what may be termed the thermal control zone since its temperature controls the cyclic operation of the system.

When the temperature of the water surrounding the thermostat is modified by the approach of the hot water in its gradual descent, until the predetermined critical temperature is reached the gas will be shut off in the manner previously described until the operation is repeated through a certain amount of the hot water having been drawn off. The tank may thus be considered as divided into an upper hot water storage portion, a lower cold water condensing part and an intermediate thermal control zone. The refrigerative cycle is under the control of the water temperature in the thermal control zone. And furthermore, the extent of the refrigeration for each cyclic operation is determined by the volume and temperature of the stored hot water. This inter-dependence between the refrigerative cycle and the hot water storage and under the control of the latter makes my system peculiarly adapted for domestic installations.

I claim:—

1. A process of refrigeration which consists in causing a liquid to evaporate by exhausting the vapor therefrom and discharging the said vapor into a body of water and controlling the exhausting of the vapor by the volume and temperature of said body of water.

2. A process of refrigeration which consists in causing a liquid to evaporate by exhausting the vapor therefrom through the ejector action of steam jets and discharging the said vapor together with the exhaust steam into a body of water and controlling the exhausting of the vapor by the volume and temperature of said body of water.

3. A process of refrigeration which consists in causing a liquid to evaporate by exhausting the vapor therefrom through the ejector action of steam jets and discharging the said vapor together with the exhaust steam into a body of water and controlling the generation of steam and the consequent duration of the exhausting of the vapor by the volume and temperature of said body of water.

4. A refrigerating apparatus of the vacuum type described, comprising evaporating tanks, a series of vacuum producing steam jets connected therewith, a steam generator for supplying said jets, a storage water tank, a condensing coil located in the lower portion thereof and receiving the exhaust from said steam jets, and a thermostatic device actuated by the heat accumulated in the body of water in said tank and operating to control said steam generator.

5. A refrigerating apparatus of the vacuum type described, comprising evaporating tanks, a series of vacuum producing steam jets connected therewith, a steam generator for supplying said jets, a heating medium therefor, a storage water tank, a condensing coil located in the lower portion thereof and receiving the exhaust from said steam jets, and a thermostatic device actuated by the heat accumulated in the body of water in said tank and operating to control the supply of said heating medium.

6. A refrigerating apparatus of the vacuum type described, comprising evaporating tanks located in a refrigerating chamber, a series of vacuum producing steam jets connected therewith, a steam generator for supplying steam to said jets, a fluid heating medium therefor, a storage water tank, a condensing coil located in the lower portion of said water tank and connected with the exhaust from said steam jets, means for withdrawing hot water from the top of said water tank and for supplying cold water to the bottom thereof, and a thermostatic device actuated by the temperature of the water to control the supply of said heating medium.

In testimony whereof I affix my signature.

NATHANIEL B. WALES.